(12) United States Patent
Chan et al.

(10) Patent No.: US 9,851,596 B2
(45) Date of Patent: Dec. 26, 2017

(54) OPTICAL COMPOSITE LAYER STRUCTURE WITH A BUILT-IN TOUCH SENSITIVE POLYMER DISPERSED LIQUID CRYSTAL STRUCTURE

(71) Applicant: NANOBIT TECH. CO., LTD., Taoyuan County (TW)

(72) Inventors: Te-Fong Chan, Taoyuan County (TW); Fu-Tien Ku, Taoyuan County (TW); Shiou-Ming Liu, Taoyuan County (TW); Yu-Yang Chang, Taoyuan County (TW); Te-Liang Yu, Taoyuan County (TW)

(73) Assignee: NANOBIT TECH. CO., LTD., Taoyuan County (TW)

( * ) Notice: Subject to any disclaimer, the term of this patent is extended or adjusted under 35 U.S.C. 154(b) by 118 days.

(21) Appl. No.: 14/957,112

(22) Filed: Dec. 2, 2015

(65) Prior Publication Data
US 2017/0075153 A1    Mar. 16, 2017

(30) Foreign Application Priority Data

Sep. 10, 2015 (TW) .............................. 104214710 U

(51) Int. Cl.
| | | |
|---|---|---|
| *G02F 1/1334* | (2006.01) |
| *G02F 1/1333* | (2006.01) |
| *G06F 3/041* | (2006.01) |
| *G06F 3/044* | (2006.01) |
| *G02F 1/1343* | (2006.01) |
| *B32B 17/10* | (2006.01) |

(52) U.S. Cl.
CPC ........ *G02F 1/1334* (2013.01); *G02F 1/13338* (2013.01); *G06F 3/044* (2013.01); *G06F 3/0416* (2013.01); *B32B 17/10504* (2013.01); *G02F 1/134309* (2013.01)

(58) Field of Classification Search
CPC .. G02F 1/1334; G02F 1/13338; G06F 3/0416; G06F 3/045
See application file for complete search history.

(56) References Cited

U.S. PATENT DOCUMENTS

2017/0153467 A1\*    6/2017    Chang ................... G02F 1/1334

\* cited by examiner

*Primary Examiner* — Dung Nguyen
(74) *Attorney, Agent, or Firm* — Chun-Ming Shih; HDLS IPR Services

(57) ABSTRACT

The invention provides an optical composite layer structure with a built-in touch sensitive polymer dispersed liquid crystal (PDLC) structure. The optical composite layer structure comprises an upper transparent substrate, a lower transparent substrate, an upper transparent conductive layer, a lower transparent conductive layer and a PDLC layer. A PDLC circuit and a touch sensitive circuit are provided on the upper and lower transparent conductive layers. A cable region that is electrically connected to external soft circuit cables is provided at an end of the upper transparent conductive layer and the lower transparent conductive layer to electrically connect to an external control unit. With a touch sensitive operation of a touch sensitive circuit of the optical composite layer structure, a signal instruction is provided to the control unit. The corresponding PDLC circuit may drive the corresponding regions of PDLC layer to conduct the change of light transmission of local region.

8 Claims, 12 Drawing Sheets

OPTICAL COMPOSITE LAYER STRUCTURE WITH A BUILT-IN TOUCH SENSITIVE POLYMER DISPERSED LIQUID CRYSTAL STRUCTURE

BACKGROUND OF THE INVENTION

Field of the Invention

The present invention relates to an optical composite layer structure, more particularly to a composite layer structure in combination with a polymer dispersed liquid crystal layer and a touch sensitive transparent conductive layer.

Description of the Related Art

A traditional polymer dispersed liquid crystal (PDLC) is formed by using anisotropic liquid crystal droplets distributing in polymers uniformly, typically anisotropic liquid crystal droplets with positive dielectric constant distributing in polymers uniformly that have no a specific direction in a normal state, and the light transmitted through the anisotropic liquid crystal droplets fails to match with the refractive index of the polymers so that incident light may scatter seriously due to many interfaces existing and light transmission rate is low. If a specific electric field is provided, the anisotropic liquid crystal droplets with positive dielectric constant may be arranged forward along the electric field, and the light transmitted through the anisotropic liquid crystal droplets with positive dielectric constant may match with the refractive index of the polymers so that the most incident light may transmit through forward and the light transmission rate is increased. Smart windows are formed by packaging PDLC in transparent substrates such as conductive glasses and switching the electric field on or off to control the change of transparency of the transparent substrates. Smart windows can dynamically change the tinting of glass to control the amount of light/heat that enters a building. They can also be used to create on-demand private spaces for offices. Recently, soft conductive transparent resins have been used to package PDLC instead of the conductive glasses by the advancing process and material so that the process can be simplified greatly and the application of the related products can be enhanced greatly. For example, the structure of soft conductive transparent resins packaging PDLC in combination with transparent adhesive technologies can be attached on glass of buildings, windows of cars, refrigerators or projection walls for increasing use of applications.

Recently, a laminate structure of PDLC layer in combination with a touch sensitive layer that can produce a change of transparency of PDLC by an electric field block or dot array setting in combination with external wired or wireless switch and touch sensitive operation, as shown in FIG. 1. The structure comprises a polymer dispersed liquid crystal composite layer 100, a first optical adhesive layer 200 and a touch sensitive composite 300. The polymer dispersed liquid crystal composite layer 100 includes an upper transparent substrate 101, a lower transparent substrate 102, an upper transparent conductive layer 103, a lower transparent conductive layer 104 and a PDLC layer 105. The touch sensitive composite 300 is provided on a side surface of the first optical adhesive layer 200, and the touch sensitive composite 300 at least includes a first touch sensitive composite 301, a second touch sensitive composite 302, a second optical adhesive layer 303 and an optical cover layer 304. The structure can produce the change of images and has ease of use. However, the structure is complex that may result in a high material cost, and the optical transparency of the structure is greatly reduced.

SUMMARY OF THE INVENTION

It is an object of the present invention to disclose an optical composite layer structure. The optical composite layer structure is formed of two transparent substrates, each of the two transparent substrates having a transparent conductive layer thereon, interposed a PDLC layer between the two transparent substrates by a side surface having the transparent conductive layer. The transparent conductive layer has a PDLC circuit and a touch sensitive circuit, and the PDLC circuit can drive the corresponding regions of PDLC layer to conduct the change of light transmission of local region. A cable region that is electrically connected to external soft circuit cables is provided at an end of each transparent conductive layer to electrically connect to an external control unit.

It is another object of the present invention to disclose an optical composite layer structure. The optical composite layer structure is attached to a fixed light transmission substrate by a side surface of one of the two transparent substrates with an optical adhesive layer to form an optical composite layer attaching structure.

It is still another object of the present invention to disclose an optical composite layer structure. The PDLC circuit and the touch sensitive circuit of each transparent conductive layer may be formed by etching.

Accordingly, the present invention provides an optical composite layer structure with a built-in touch sensitive polymer dispersed liquid crystal structure, electrically connected with an external control unit. The optical composite layer structure comprises an upper transparent substrate, a lower transparent substrate, an upper transparent conductive layer, a lower transparent conductive layer and a polymer dispersed liquid crystal (PDLC) layer. Also, an upper curing layer is formed on a side surface of the upper transparent substrate, and the upper transparent conductive layer is provided on a side surface of the upper curing layer, and the upper transparent conductive layer is connected with the control unit. Similarly, a lower curing layer is formed on a side surface of the lower transparent substrate, and the lower transparent conductive layer is provided on a side surface of the lower curing layer to correspond with the upper transparent conductive layer, and the lower transparent conductive layer is connected with the control unit. The PDLC layer is provided between the upper transparent conductive layer and the lower transparent conductive layer. The upper transparent conductive layer comprises an upper circuit region, a plurality of upper leads which is connected with the upper circuit region and an upper cable region which is connected with the upper leads. The lower transparent conductive layer comprises a lower circuit region, a plurality of lower leads which is connected with the lower circuit region and a lower cable region which is connected with the lower leads. The upper circuit region and the lower circuit region output a touch sensitive signal to the control unit, whereby the control unit drives the PDLC layer through the upper circuit region and the lower circuit region.

In an aspect of the present invention, the upper circuit region consists of a plurality of horizontal PDLC electrode lines, and each PDLC electrode line electrically connects to an end of each upper lead respectively and another end of each upper lead extends to the upper cable region on a side of the upper transparent substrate; and the lower circuit region consists of a plurality of vertical X axis electrode lines and Y axis electrode lines spaced-part with respect to each other, and each X axis electrode line and Y axis electrode line electrically connects to an end of each lower lead respectively and another end of each lower lead extends to the lower cable region on a side of the lower transparent substrate.

In another aspect of the present invention, the upper circuit region consists of a plurality of horizontal X axis electrode lines and PDLC electrode lines spaced-part with respect to each other, and each X axis electrode line and PDLC electrode line electrically connects to an end of each upper lead respectively and another end of each upper lead extends to the upper cable region on a side of the upper transparent substrate; and the lower circuit region consists of a plurality of vertical Y axis electrode lines and PDLC electrode lines spaced-part with respect to each other, and each Y axis electrode line and PDLC electrode line electrically connects to an end of each lower lead respectively and another end of each lower lead extends to the lower cable region on a side of the lower transparent substrate.

In still another aspect of the present invention, the upper circuit region consists of a plurality of horizontal PDLC electrode lines, and each PDLC electrode line electrically connects to an end of each upper lead respectively and another end of each upper lead extends to the upper cable region on a side of the upper transparent substrate; and the lower circuit region consists of a plurality of vertical X axis electrode lines, Y axis electrode lines and PDLC electrode lines, in which each PDLC electrode line is arranged between a X axis electrode line and a Y axis electrode line, and each X axis electrode line, Y axis electrode line and PDLC electrode line electrically connects to an end of each lower lead respectively and another end of each lower lead extends to the lower cable region on a side of the lower transparent substrate.

In an aspect of the present invention, the lower transparent conductive layer and the lower transparent conductive layer are made of an inorganic conductive material or an organic conductive material. The organic conductive material is carbon nanotube or poly-3, 4-ethylenedioxythiophene. Both the upper transparent conductive layer and the lower transparent conductive layer have a thickness in a range of 100 nm-10 um. The PDLC layer is formed of PDLC resins as a main element and mixing with a material selected from the group consisting of UV resins, thermal setting resins and silica. The optical composite layer structure is attached to a fixed light transmission substrate by a side surface of the upper transparent substrate or the lower transparent substrate with an optical adhesive layer.

In an aspect of the present invention, the optical composite layer structure further comprises a first optical transparent insulation layer provided between the upper transparent conductive layer and the PDLC layer; and a second optical transparent insulation layer provided between the PDLC layer and the lower transparent conductive layer. In an aspect of the present invention, the PDLC electrode line has a width greater than or equal to that of X axis electrode line and Y axis electrode line.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
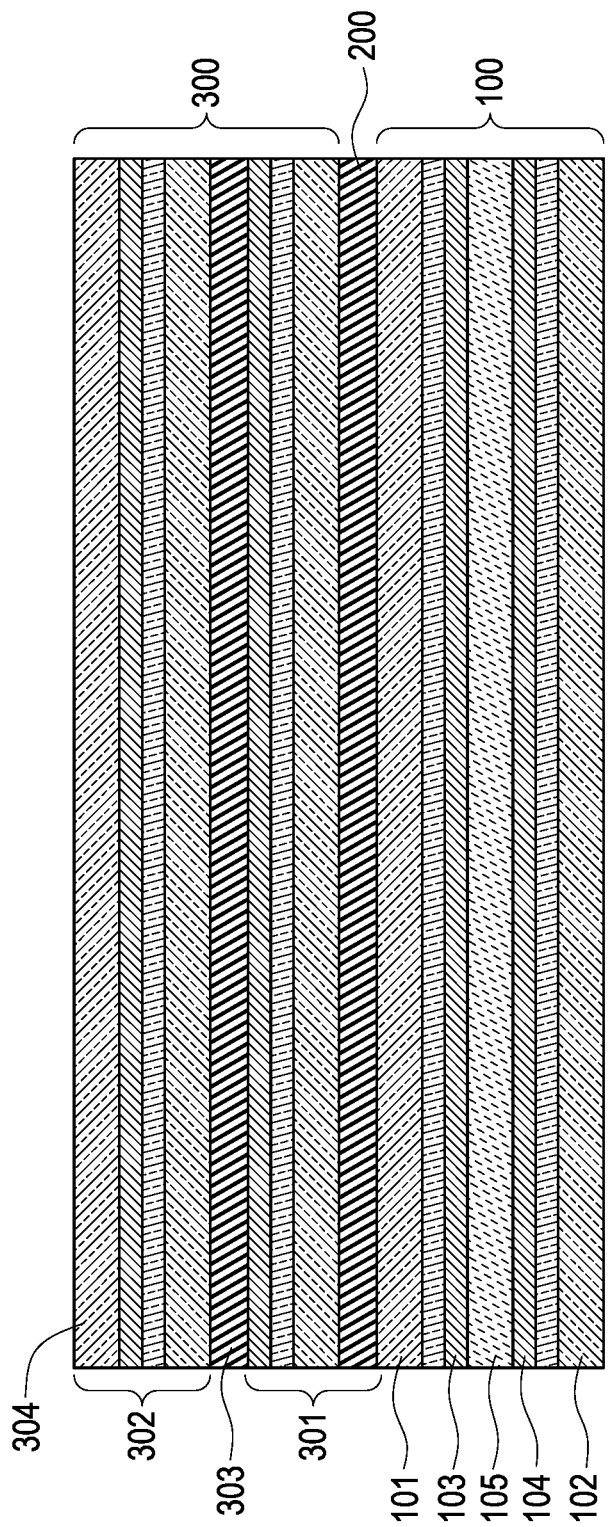
FIG. 1 shows a side view of an optical composite layer structure of prior art.
Figure 2:
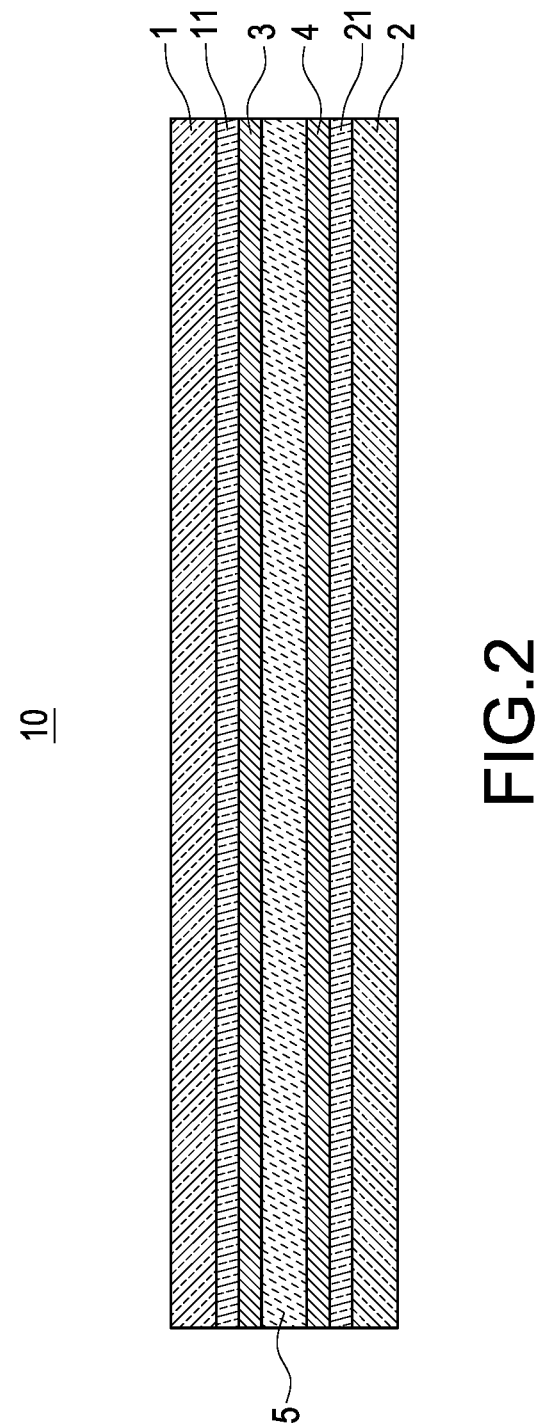
FIG. 2 shows a side view of an optical composite layer structure of a first embodiment according to the present invention.
Figure 3:
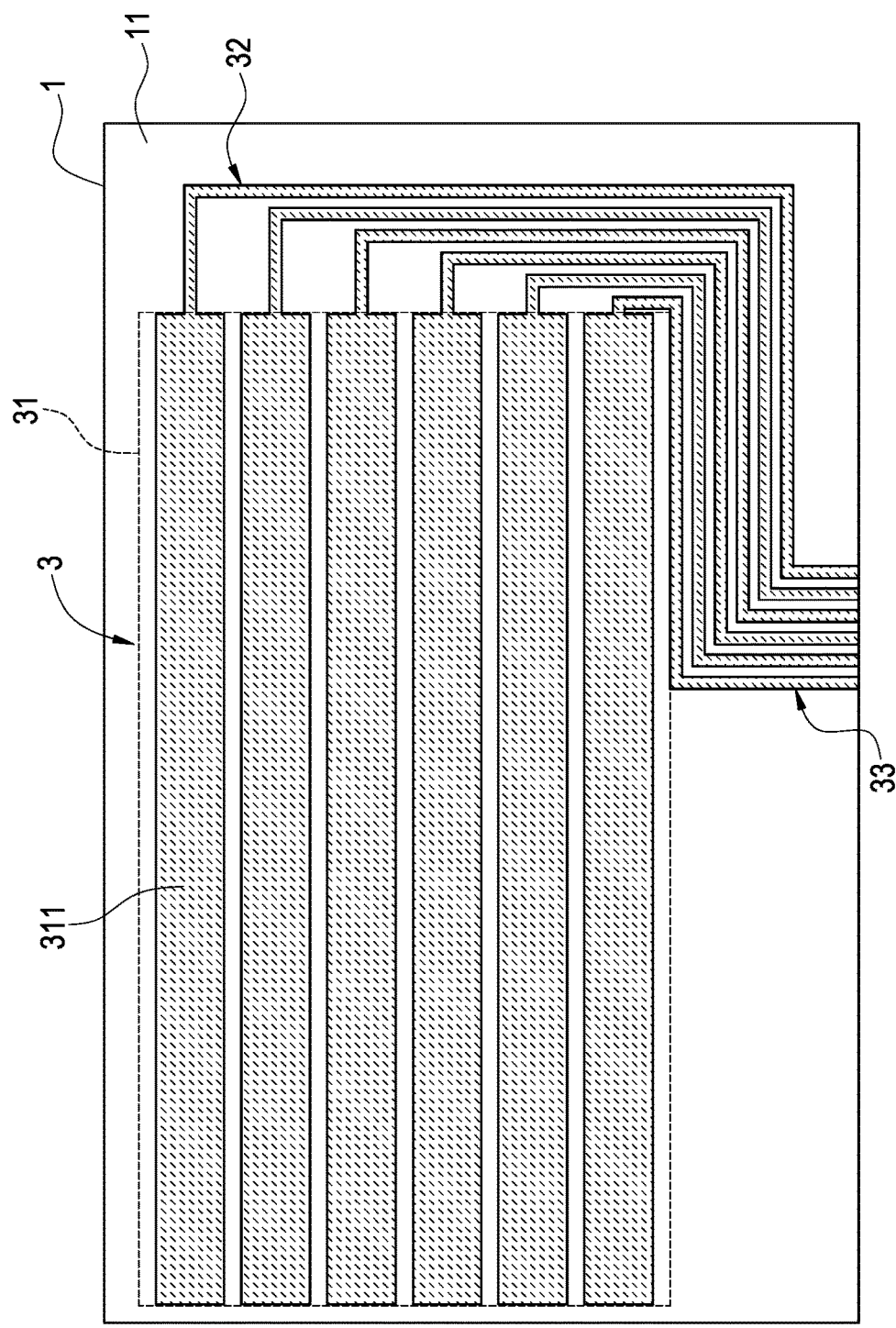
FIG. 3 shows a top view FIG. 2 from direction of an upper transparent substrate.
Figure 4:
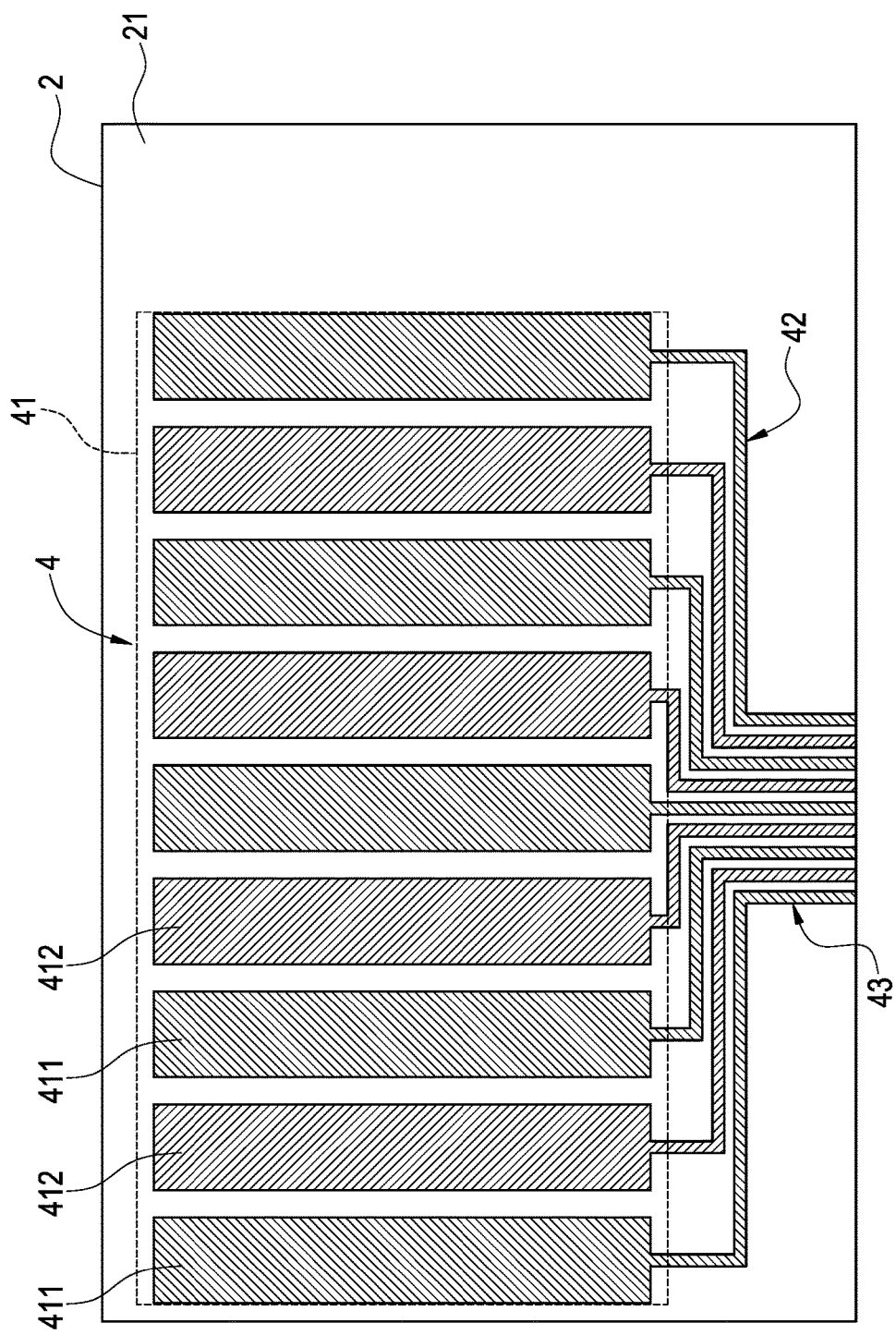
FIG. 4 shows a top view FIG. 2 from direction of a lower transparent substrate.

FIG. 2 shows a side view of an optical composite layer structure of a first embodiment according to the present invention. FIG. 3 shows a top view FIG. 2 from direction of an upper transparent substrate. FIG. 4 shows a top view FIG. 2 from direction of a lower transparent substrate. According to FIGS. 2-4, in the first embodiment, the optical composite layer structure 10 with a built-in touch sensitive polymer dispersed liquid crystal (PDLC) structure comprises an upper transparent substrate 1, a lower transparent substrate 2, an upper transparent conductive layer 3, a lower transparent conductive layer 4 and a polymer dispersed liquid crystal (PDLC) layer 5.

The upper transparent substrate 1 and the lower transparent substrate 2 are light transmission resin substrate or light transmission glass substrate. The light transmission resin is polyethylene terephthalate (PET), polyethylene (PE), polyimide (PI), polyamide (PA), polyurethanes (PU) or acrylic resin, etc. The upper transparent substrate 1 has a thickness in a range of 10 um-10 mm, and preferably, in a range of 20 um-500 um. The lower transparent substrate 2 has a thickness in a range of 10 um-10 mm, and preferably, in a range of 20 um-500 um. Also, an upper curing layer 11 is formed on a side surface of the upper transparent substrate 1 by a curing treatment. A lower curing layer 12 is formed on a side surface of the lower transparent substrate 2 by a curing treatment. The material used in the upper curing layer 11 and the lower curing layer 12 is selected from the group consisting of acrylic resin, epoxy and silica. The upper curing layer 11 has a thickness in a range of 500 nm-50 um, and preferably, in a range of 1 um-5 um. The lower curing layer 12 has a thickness in a range of 500 nm-50 um, and preferably, in a range of 1 um-5 um.

Please refer to FIG. 2. The upper transparent conductive layer 3 is provided on a side surface of the upper curing layer 11. The upper transparent conductive layer 3 is a circuit or conductive block formed by dry etching or wet etching with inorganic conductive material of metallic oxides such as silver oxide, nano-silver oxide or indium tin oxide (ITO), or organic conductive material such as carbon nanotube or poly-3, 4-ethylenedioxythiophene (PEDOT) that has the light transmission rate of 70%-95%. The upper transparent conductive layer 3 has a thickness in a range of 5 nm-50 um, and preferably, in a range of 100 nm-10 um. In addition, in FIG. 3, the upper transparent conductive layer 3 comprises an upper circuit region 31, a plurality of upper leads 32 and an upper cable region 33. The upper circuit region 31 consists of a plurality of horizontal PDLC electrode lines 311, and each PDLC electrode line 311 electrically connects to an end of each upper lead 32 respectively and another end of each upper lead 32 extend to the upper cable region 33 on a side of the upper transparent substrate 1. Also, the upper cable region 33 is electrically connected to external cables (not shown in FIG. 3).

Please refer to FIG. 2 again. The lower transparent conductive layer 4 is provided on a side surface of the lower curing layer 21, and corresponded with the upper transparent conductive layer 3. The lower transparent conductive layer 4 is a circuit or conductive block formed by dry etching or wet etching with inorganic conductive material of metallic oxides such as silver oxide, nano-silver oxide or indium tin oxide (ITO), or organic conductive material such as carbon nanotube or poly-3, 4-ethylenedioxythiophene (PEDOT) that has the light transmission rate of 70%-95%. The upper transparent conductive layer 3 has a thickness in a range of 5 nm-50 um, and preferably, in a range of 100 nm-10 um. In addition, in FIG. 4, the lower transparent conductive layer 4 comprises a lower circuit region 41, a plurality of lower leads 42 and a lower cable region 43. The lower circuit region 41 consists of a plurality of vertical X axis electrode lines 411 and Y axis electrode lines 412 spaced-part with respect to each other, and each X axis electrode line 411 and Y axis electrode line 412 electrically may connect to an end of each lower lead 42 respectively and another end of each lower lead 42 may extend to the lower cable region 43 on a side of the lower transparent substrate 2. Also, the lower cable region 43 is electrically connected to external cables (not shown in FIG. 4).

Please refer to FIG. 2 again. PDLC layer 5 is provided between the upper transparent conductive layer 3 and the lower transparent conductive layer 4. The PDLC layer 5 has a thickness in a range of 1 um-100 um. The PDLC layer 5 is formed of PDLC resins as a main element and mixing with a material selected from the group consisting of UV resins, thermal setting resins and silica, wherein PDLC resins have the light transmission rate of 50%-80% and refractive index of 1.5-5.5 after electric conduction.

The optical composite layer structure 10 with a built-in touch sensitive polymer dispersed liquid crystal (PDLC) structure is formed by an upper transparent substrate 1, a lower transparent substrate 2, an upper transparent conductive layer 3, a lower transparent conductive layer 4 and a polymer dispersed liquid crystal (PDLC) layer 5.

Figure 5:
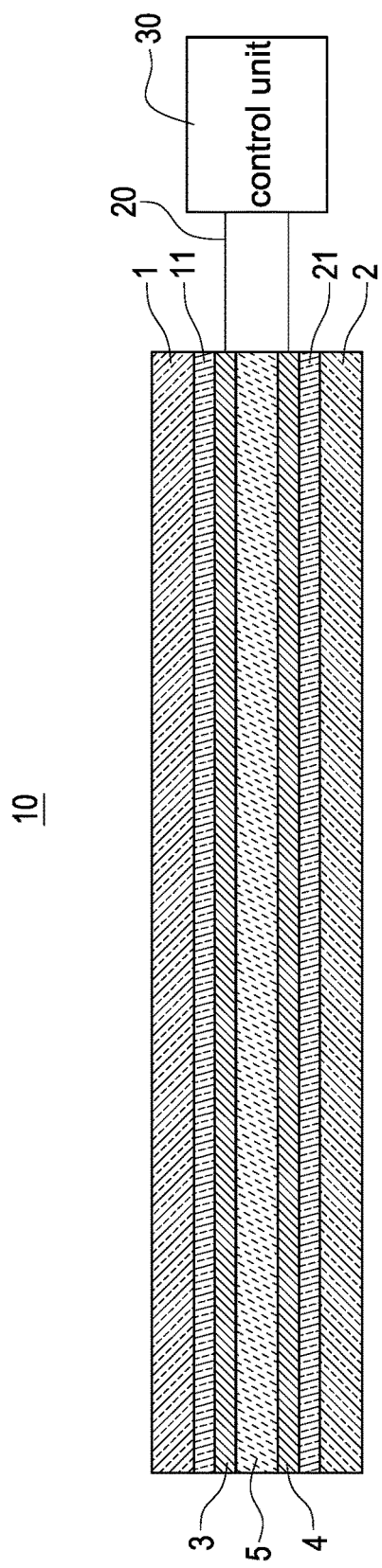
FIG. 5 shows a side view of an optical composite layer structure of a second embodiment according to the present invention, wherein optical composite layer structure connects with an external control unit.

FIG. 5 shows a side view of an optical composite layer structure of a second embodiment according to the present invention, wherein optical composite layer structure connects with an external control unit. Please also refer to FIGS. 3 and 4. In an embodiment, the optical composite layer structure 10 is connected with a control unit 30 by a first cable 20 and a second cable. Specifically, the upper cable region 33 of the upper transparent conductive layer 3 is electrically connected to an end of a first cable 20, and the control unit 30 is electrically connected to another end of the first cable 20; and the lower cable region 43 of the lower transparent conductive layer 4 is electrically connected to an end of a second cable, and the control unit 30 is electrically connected to another end of the second cable. A user can use a touch sensitive operation of a touch sensitive circuit of the optical composite layer structure 10 to provide a signal instruction to the control unit 30. Accordingly, the corresponding PDLC circuit may drive the corresponding regions of PDLC layer 5 to conduct the change of light transmission of local region, for example hand writing board, the gray level change of light transmission of PDLC and light transmission control of local region of PDLC, etc.

Figure 6:
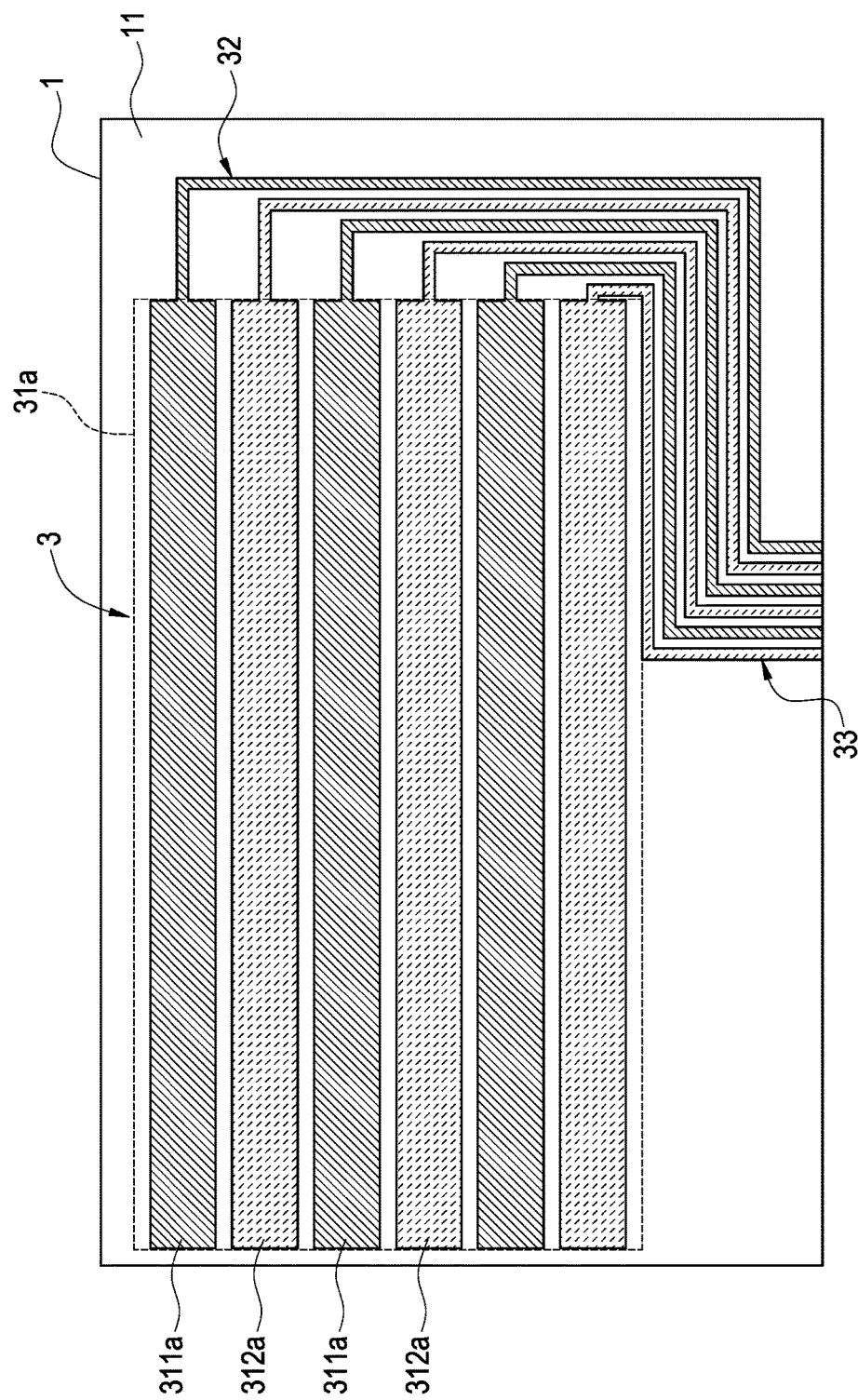
FIG. 6 shows a top view of an upper transparent substrate of a third embodiment according to the present invention.
Figure 7:
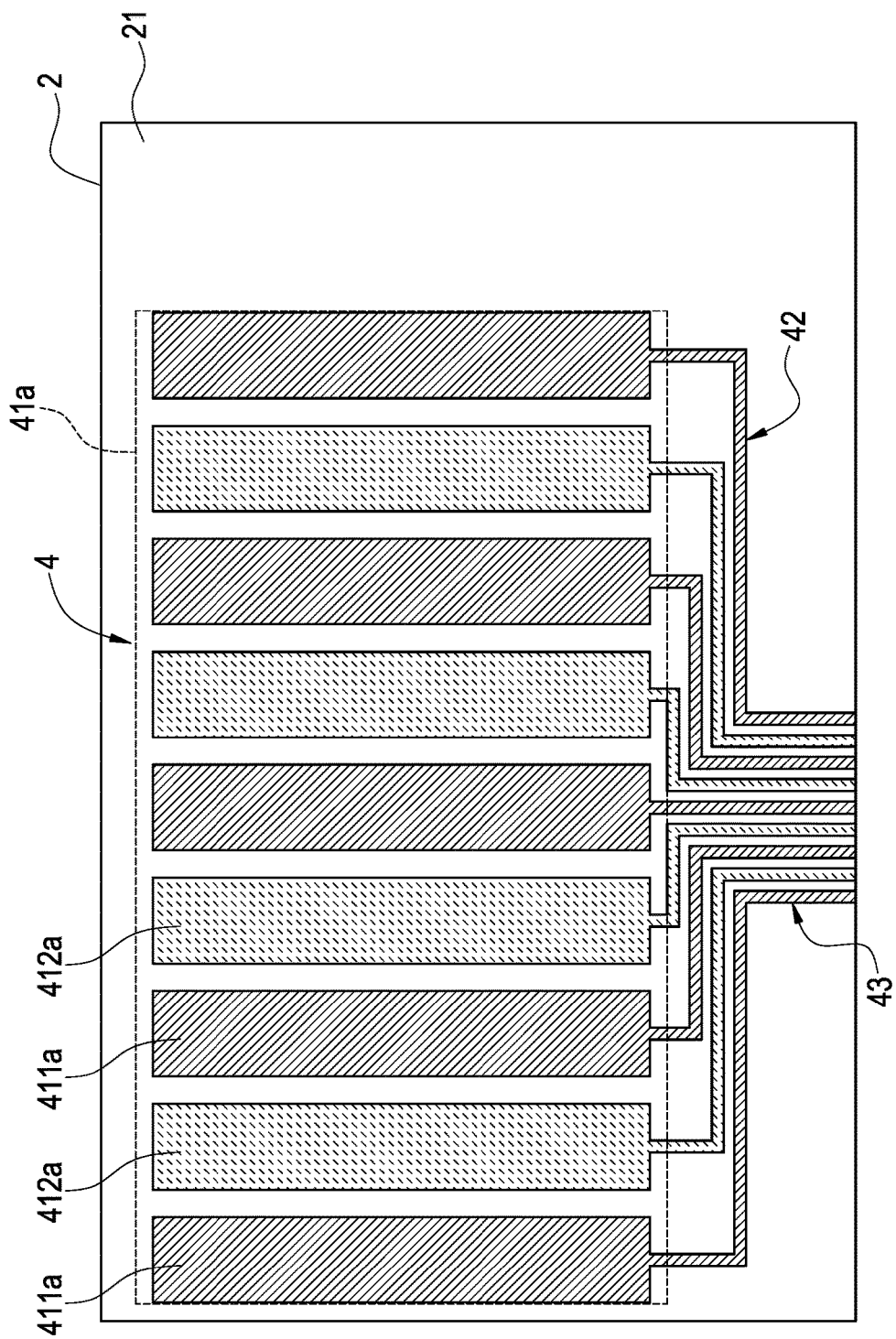
FIG. 7 shows a top view of a lower transparent substrate of a third embodiment according to the present invention.

FIG. 6 shows a top view of an upper transparent substrate of a third embodiment according to the present invention. FIG. 7 shows a top view of a lower transparent substrate of a third embodiment according to the present invention. Please refer to FIG. 6. The difference between the third embodiment and the first embodiment of FIGS. 2-4 is that an upper circuit region 31*a* of an upper transparent conductive layer 3 of the third embodiment consists of a plurality of horizontal X axis electrode lines 311*a* and PDLC electrode lines 312*a* spaced-part with respect to each other, and each X axis electrode lines 311*a* and PDLC electrode lines 312*a* electrically connects to an end of each upper lead 32 respectively and another end of each upper lead 32 may extend to the upper cable region 33 on a side of the upper transparent substrate 1.

Please refer to FIG. 7. The lower circuit region 41*a* of an lower transparent conductive layer 4 consists of a plurality of vertical Y axis electrode lines 411*a* and PDLC electrode lines 412*a* spaced-part with respect to each other, and each Y axis electrode line 411*a* and PDLC electrode line 412*a* electrically connects to an end of each lower lead 42 respectively and another end of each lower lead 42 may extend to the lower cable region 43 on a side of the lower transparent substrate 2.

Figure 8:
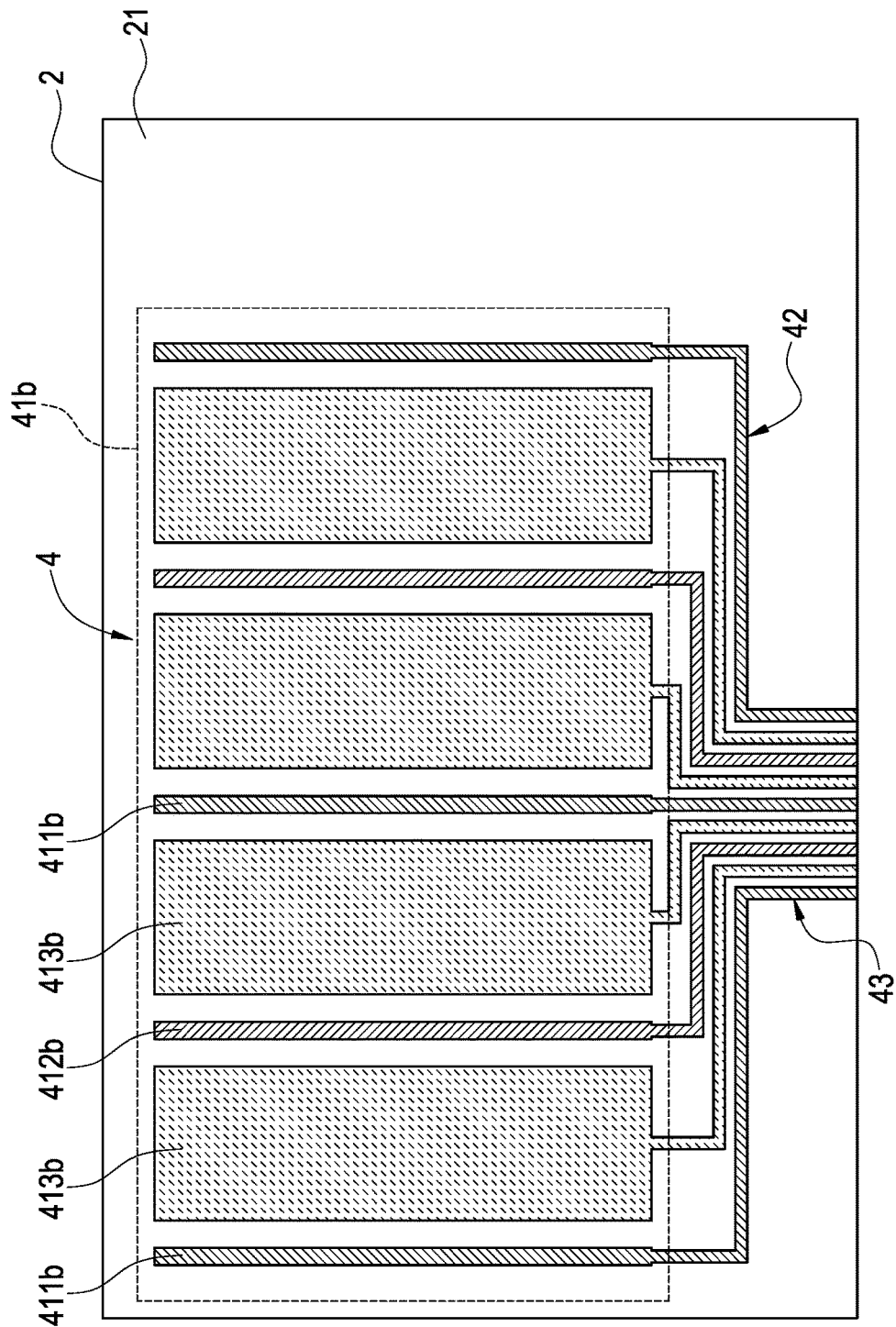
FIG. 8 shows a top view of a lower transparent substrate of a fourth embodiment according to the present invention.

FIG. 8 shows a top view of a lower transparent substrate of a fourth embodiment according to the present invention. The difference between the fourth embodiment and the first embodiment of FIGS. 2-4 is that a lower circuit region 41*b* of a lower transparent conductive layer 4 of the fourth embodiment consists of a plurality of vertical X axis electrode lines 411*b*, Y axis electrode lines 412*b* and PDLC electrode lines 413*b*, in which each PDLC electrode line 413*b* is arranged between a X axis electrode line 411*b* and a Y axis electrode line 412*b*, for example a X axis electrode line 411*b* may be arranged at a right side of a PDLC electrode line 413*b*; and a Y axis electrode line 412*b* may be arranged at a left side of a PDLC electrode line 413*b*, vice versa. Each X axis electrode line 411*b*, Y axis electrode line 412*b* and PDLC electrode line 413*b* electrically may connect to an end of each lower lead 42 respectively and another end of each lower lead 42 may extend to the lower cable region 43 on a side of the lower transparent substrate 2. In FIG. 8, PDLC electrode lines 413*b* have a width greater than that of X axis electrode lines 411*b* and Y axis electrode lines 412*b*.

Figure 9:
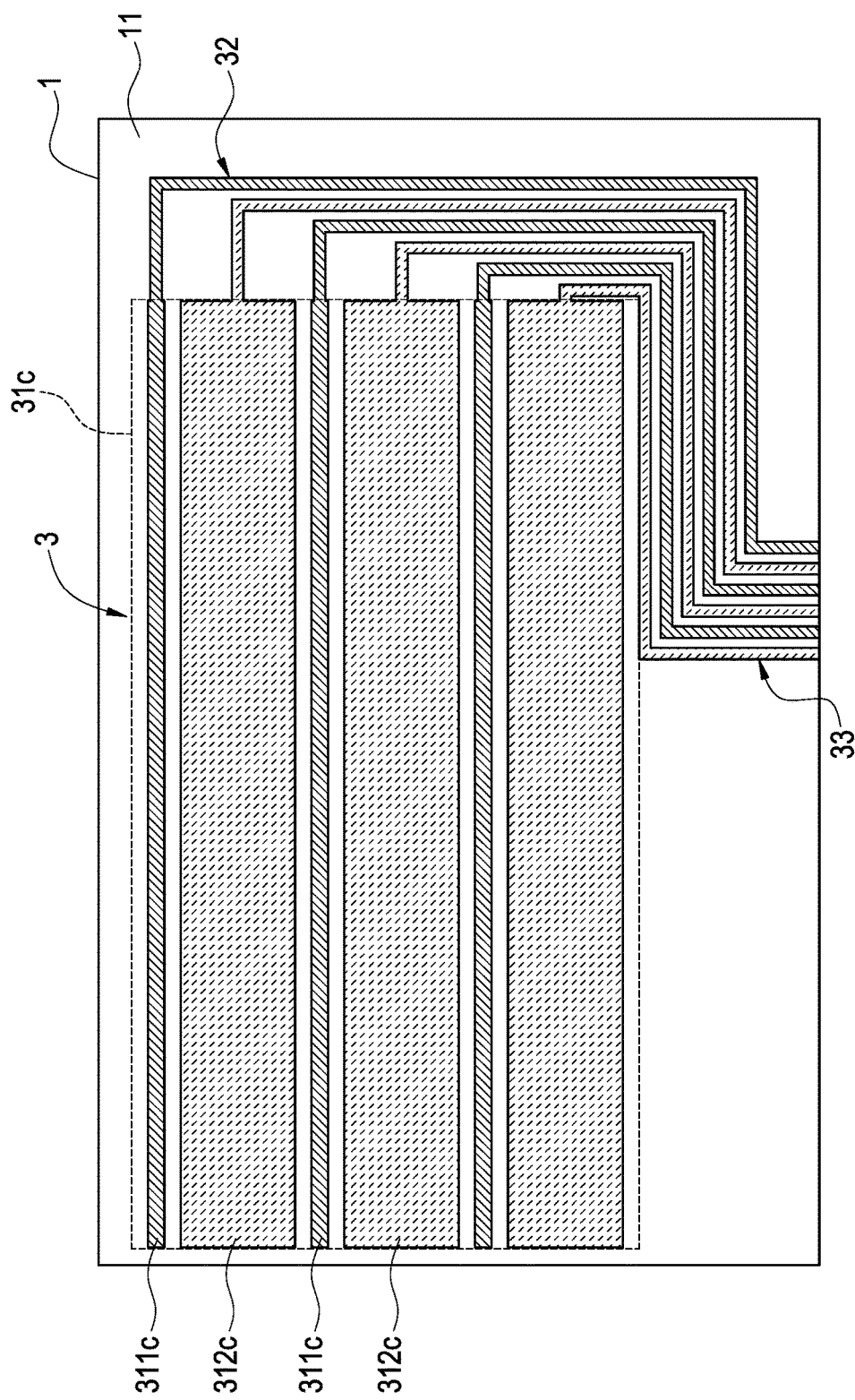
FIG. 9 shows a top view of an upper transparent substrate of a fifth embodiment according to the present invention.
Figure 10:
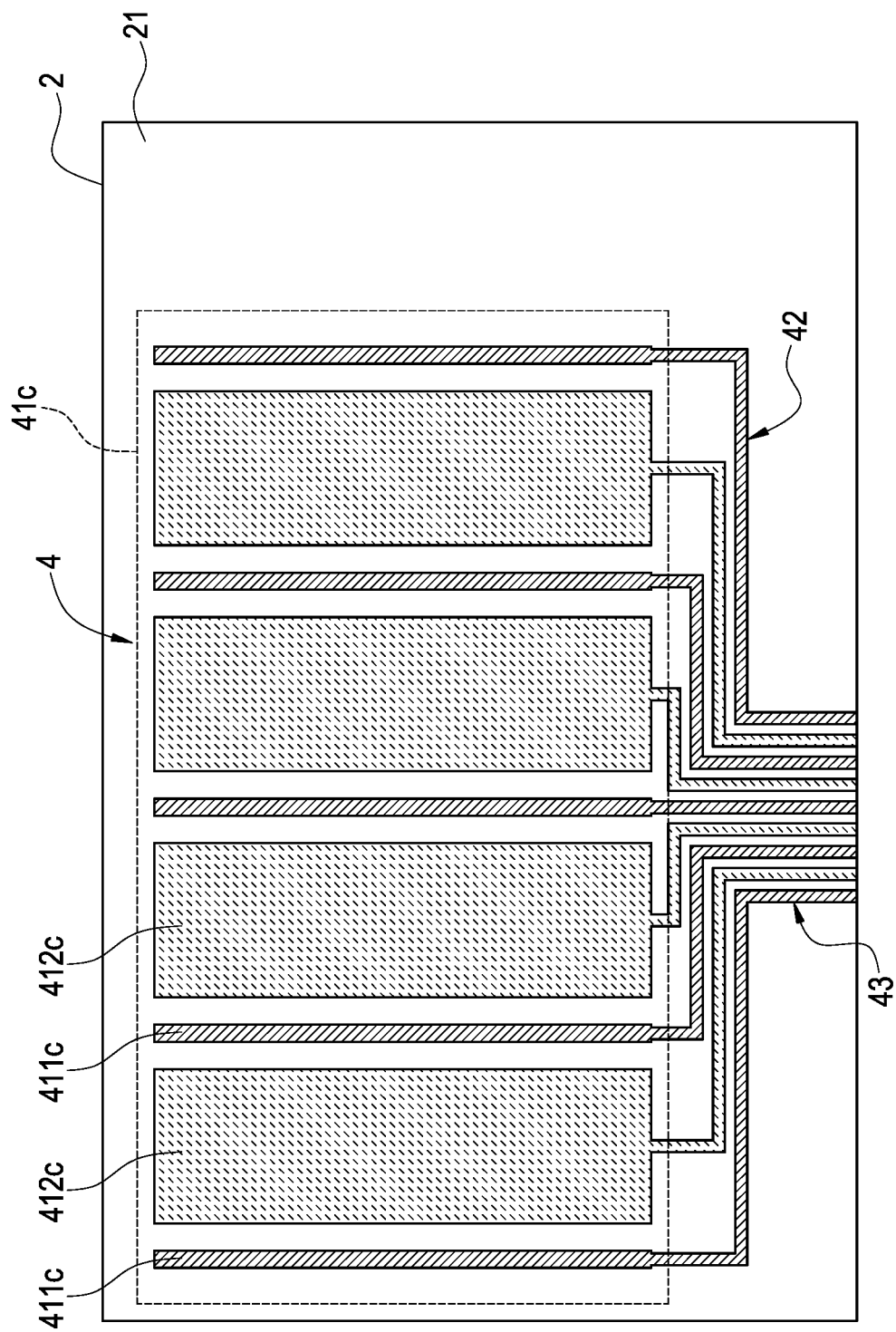
FIG. 10 shows a top view of a lower transparent substrate of a fifth embodiment according to the present invention.

FIG. 9 shows a top view of an upper transparent substrate of a fifth embodiment according to the present invention. FIG. 10 shows a top view of a lower transparent substrate of a fifth embodiment according to the present invention. The difference between the fifth embodiment and the first embodiment of FIGS. 2-4 is that an upper circuit region 31*c* of an upper transparent conductive layer 3 of the fifth embodiment consists of a plurality of horizontal X axis electrode lines 311*c* and PDLC electrode lines 312*c* spaced-part with respect to each other, and each X axis electrode line 311*c* and PDLC electrode line 312*c* electrically connects to an end of each upper lead 32 respectively and another end of each upper lead 32 may extend to the upper cable region 33 on a side of the upper transparent substrate 1. In FIG. 9, PDLC electrode lines 312c have a width greater than that of X axis electrode lines 311c.

Please refer to FIG. 10. The lower circuit region 41c of an lower transparent conductive layer 4 consists of a plurality of vertical Y axis electrode lines 411c and PDLC electrode lines 412c spaced-part with respect to each other, and each Y axis electrode line 411c and PDLC electrode line 412c electrically connects to an end of each lower lead 42 respectively and another end of each lower lead 42 may extend to the lower cable region 43 on a side of the lower transparent substrate 2. In FIG. 10, PDLC electrode lines 412c have a width greater than that of Y axis electrode lines 411c.

Figure 11:
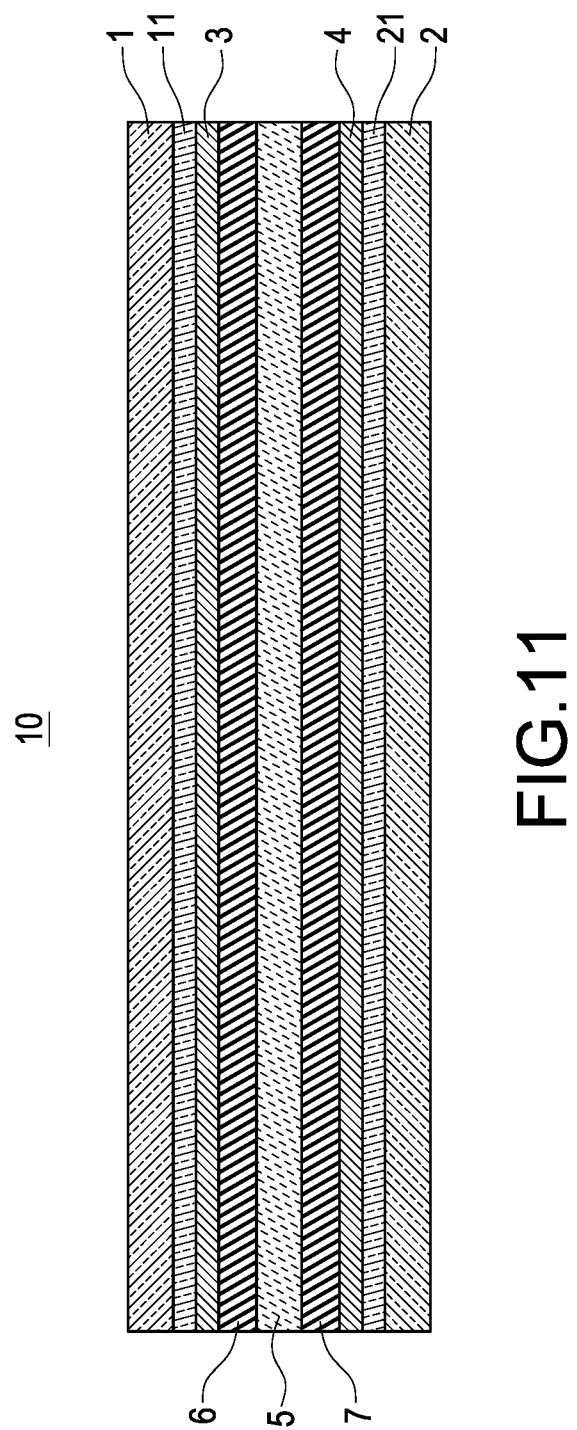
FIG. 11 shows a side view of an optical composite layer structure of a sixth embodiment according to the present invention.

FIG. 11 shows a side view of an optical composite layer structure of a sixth embodiment according to the present invention. The embodiment of FIG. 11 is similar to that of FIG. 2, in which the difference between the sixth embodiment of FIG. 11 and the embodiment of FIG. 2 is that a first optical transparent insulation layer 6 is provided between the upper transparent conductive layer 3 and the PDLC layer 5; and a second optical transparent insulation layer 7 is provided between the PDLC layer 5 and the lower transparent conductive layer 4. Each the first optical transparent insulation layer 6 and the second optical transparent insulation layer 7 of FIG. 11 is a material selected from the group consisting of acrylic resin, epoxy and silica.

Figure 12:
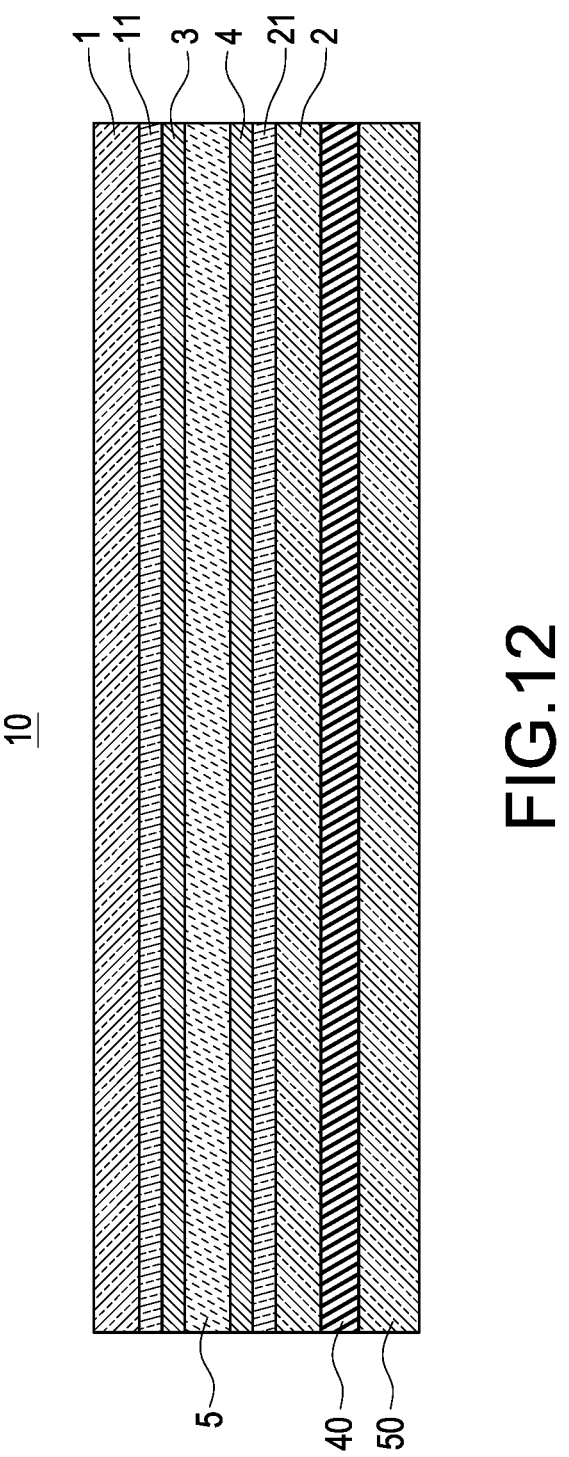
FIG. 12 shows a side view of an optical composite layer structure of a seventh embodiment according to the present invention.

FIG. 12 shows a side view of an optical composite layer structure of a seventh embodiment according to the present invention. In the embodiment of FIG. 12, the optical composite layer structure 10 is attached to a fixed light transmission substrate 50 by the upper transparent substrate 1 or the lower transparent substrate 2 with an optical adhesive layer 40. The fixed light transmission substrate 50 is glass substrate or light transmission resin substrate that can be used in window of building, showcase, window of refrigerator, windshield of car, ship or airplane or window of office, etc. The optical adhesive layer 40 has a thickness of about 1 um-1000 um. The optical adhesive layer 40 is an optical adhesive sheet with refractive index in a range of 1.1-3.5.

The invention is not limited to these embodiments, but various variations and modifications may be made without departing from the scope of the invention.

What is claimed is:

1. An optical composite layer structure with a built-in touch sensitive polymer dispersed liquid crystal structure, electrically connected with an external control unit, comprising:
   an upper transparent substrate, having an upper curing layer on a side surface of the upper transparent substrate;
   an upper transparent conductive layer, provided on a side surface of the upper curing layer, and electrically connected with the external control unit;
   a lower transparent substrate, having a lower curing layer on a side surface of the lower transparent substrate;
   a lower transparent conductive layer, provided on a side surface of the lower curing layer to correspond with the upper transparent conductive layer, and electrically connected with the external control unit; and
   a polymer dispersed liquid crystal (PDLC) layer, provided between the upper transparent conductive layer and the lower transparent conductive layer,
   wherein the upper transparent conductive layer comprises an upper circuit region, a plurality of upper leads which is connected with the upper circuit region and an upper cable region which is connected with the upper leads; and the upper circuit region consists of a plurality of horizontal PDLC electrode lines, and each PDLC electrode line electrically connects to an end of each upper lead respectively and another end of each upper lead extends to the upper cable region on a side of the upper transparent substrate; and
   the lower transparent conductive layer comprises a lower circuit region, a plurality of lower leads which is connected with the lower circuit region and a lower cable region which is connected with the lower leads; and the lower circuit region consists of a plurality of vertical X axis electrode lines and Y axis electrode lines spaced-part with respect to each other, and each X axis electrode line and Y axis electrode line electrically connects to an end of each lower lead respectively and another end of each lower lead extends to the lower cable region on a side of the lower transparent substrate,
   wherein the upper circuit region and the lower circuit region output a touch sensitive signal to the control unit, whereby the control unit drives the PDLC layer through the upper circuit region and the lower circuit region.

2. The optical composite layer structure according to claim 1, wherein the lower transparent conductive layer and the lower transparent conductive layer are made of an inorganic conductive material or an organic conductive material.

3. The optical composite layer structure according to claim 2, wherein the organic conductive material is carbon nanotube or poly-3, 4-ethylenedioxythiophene.

4. The optical composite layer structure according to claim 1, wherein both the upper transparent conductive layer and the lower transparent conductive layer have a thickness in a range of 100 nm-10 um.

5. The optical composite layer structure according to claim 1, wherein the PDLC layer is formed of PDLC resins as a main element and mixing with a material selected from the group consisting of UV resins, thermal setting resins and silica.

6. The optical composite layer structure according to claim 1, wherein the optical composite layer structure is attached to a fixed light transmission substrate by a side surface of the upper transparent substrate or the lower transparent substrate with an optical adhesive layer.

7. The optical composite layer structure according to claim 1, further comprising a first optical transparent insulation layer provided between the upper transparent conductive layer and the PDLC layer; and a second optical transparent insulation layer provided between the PDLC layer and the lower transparent conductive layer.

8. The optical composite layer structure according to claim 1, wherein the PDLC electrode line has a width greater than or equal to that of X axis electrode line and Y axis electrode line.

* * * * *